Patented Oct. 25, 1932

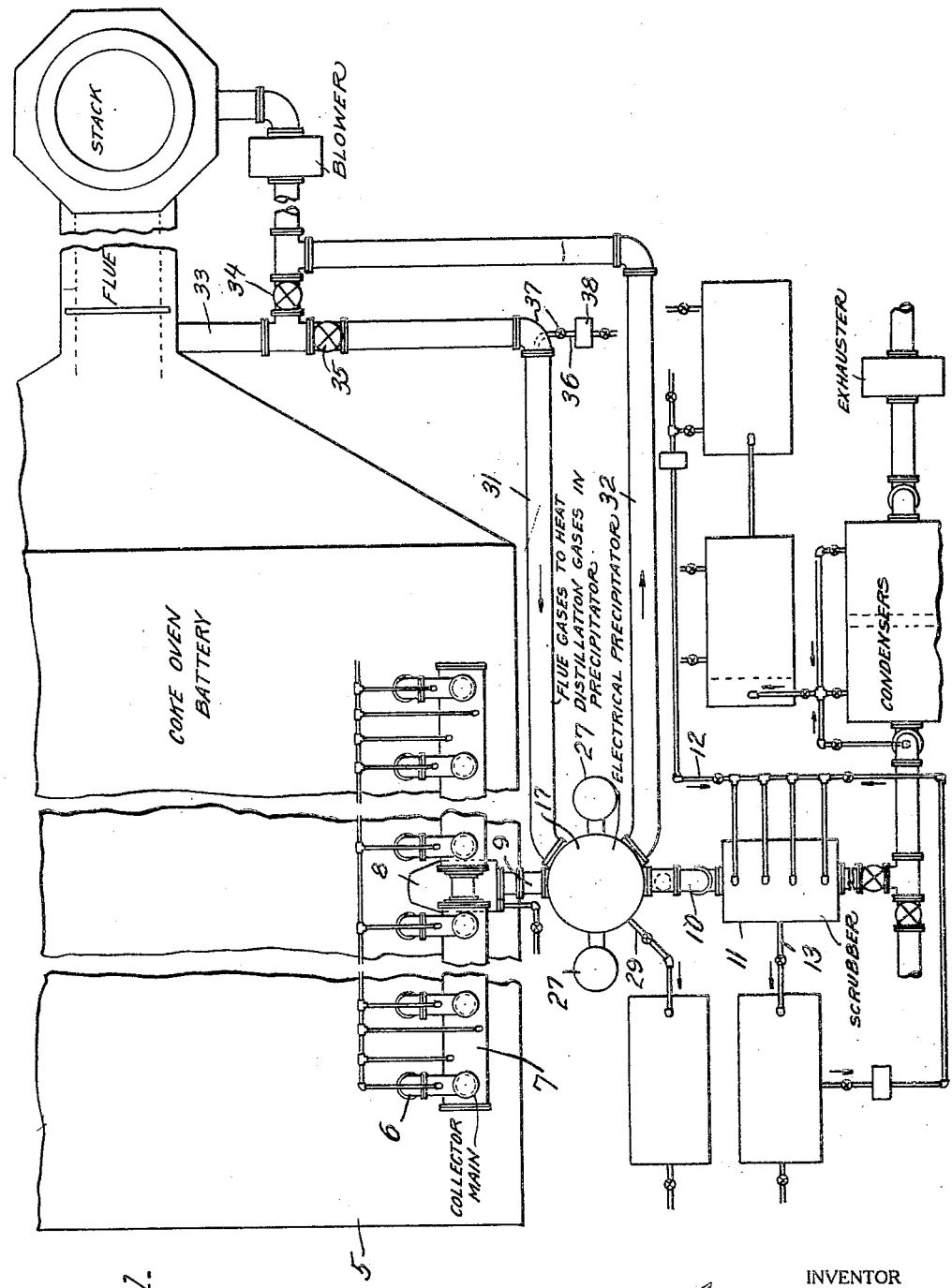

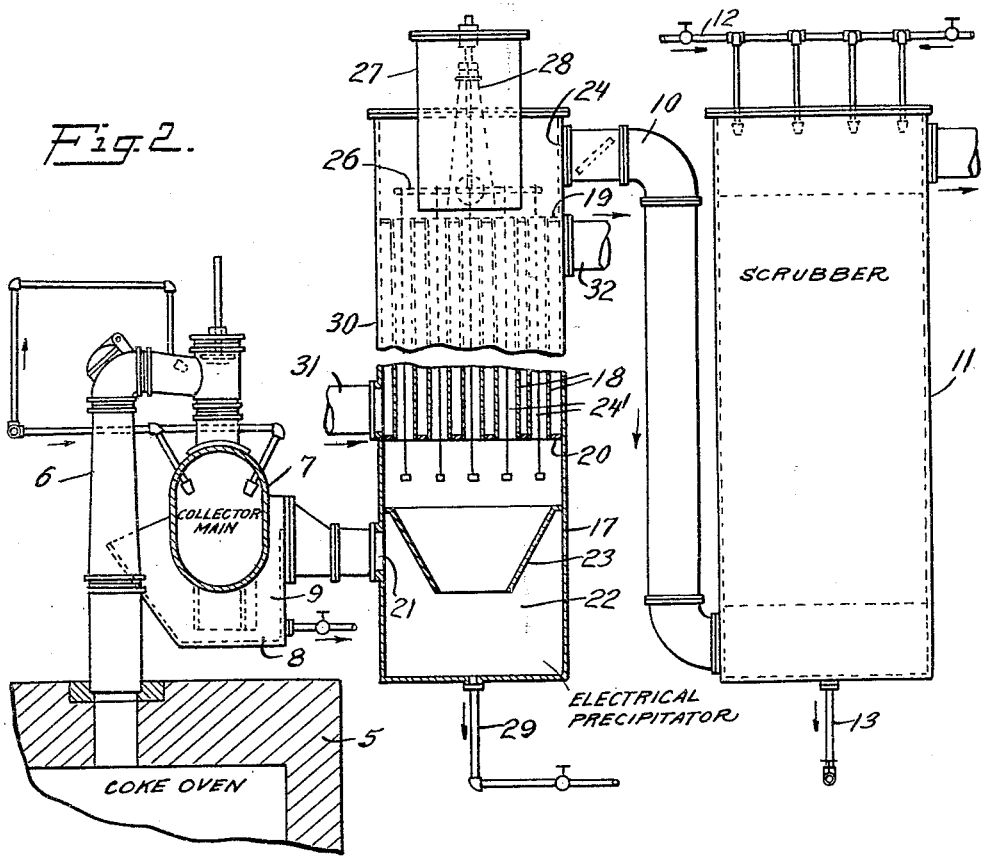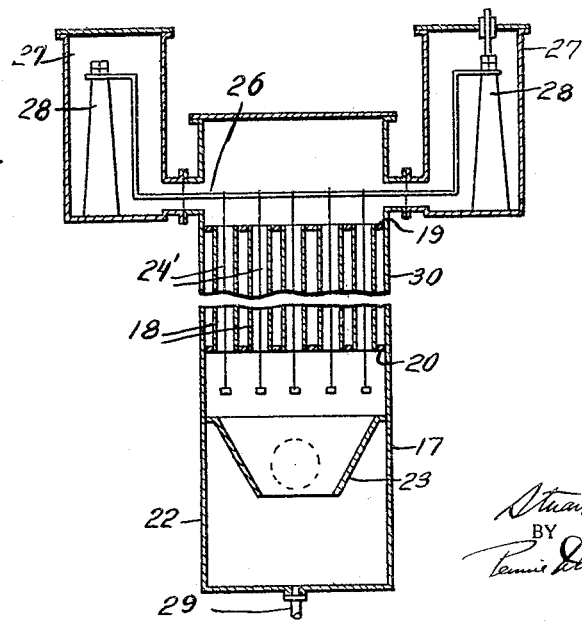

1,884,084

UNITED STATES PATENT OFFICE

STUART PARMELEE MILLER, OF TENAFLY, NEW JERSEY, ASSIGNOR TO THE BARRETT COMPANY, OF NEW YORK, N. Y., A CORPORATION OF NEW JERSEY

BY-PRODUCT COKE OVEN RECOVERY SYSTEM

Application filed June 3, 1927. Serial No. 196,270.

My invention relates to the treatment of hot coal distillation gases in an electrical precipitator and regulation of the temperature of the precipitator. More particularly, the invention relates to the heating of an electrical precipitator for treating coal distillation gases with hot flue gases from the coal distillation retorts or ovens, etc. The invention embraces both the method of treatment and the apparatus in which the treatment is carried out.

Coal distillation gases, as they come from the ovens or retorts in which they originate, carry with them solid particles, such as free carbon, coke braize, dust and other solid particles, and also a mist, "tar fog", comprised of fine particles of tar. It has been found that these solid particles and tar fog may, to a large extent, be removed by passing the gases through an electrical precipitator.

Although this invention is of more or less general application to the treatment of coal distillation gases containing entrained materials which may be removed in an electrical precipitator, it is described herewith in connection with the operation of a coke oven by-product recovery system. In the treatment of coke oven gases to remove entrained liquids and solids, the regulation of the temperature is at times of importance. In a condensing system, for example, in which the condensates are recovered fractionally, the temperature control of the various units is of importance.

At other times it is important to heat the gases and the utilization of waste heat may result in a decided saving in operating cost.

The invention is applicable whether it is desired to heat the gases passing through the precipitator or maintain them at the same temperature or prevent their dropping below a certain temperature in passing to the next succeeding unit in the system.

The drawings illustrate one adaptation of the invention to coke oven gases entering a scrubbing tower. The scrubbing tower may be used as a means for altering the composition of the scrubbing oil or of the condensable vapors in the gas stream. If, for example, it is desirable to convert an oil of relatively wide boiling range into an oil of relatively narrow boiling range, the oil may be circulated through the scrubber at such a temperature as will cause the light oil in the scrubbing oil to be absorbed by the gases. Likewise, the gases may give up to the scrubbing oil some of the heavier condensable vapor. The scrubbing oil will thus be freed to the desired extent of lighter oils and will be enriched in heavy oils. The gases will be enriched in light oil vapors and may be freed to some extent of heavy oil vapors. The scrubber in such a case functions somewhat as a rectification column in that it provides for a partial separation of light from heavy oils.

It will be understood that the scrubber may be operated in a great many different ways as respects the type of oil used for scrubbing, the temperature of oil, the temperature of the gas at the inlet, the temperature drop through the scrubber, the quantity of scrubbing oil utilized, etc. By keeping the other variables constant, the composition of the gas leaving the scrubbing tower and also the nature of the residue left in the scrubbing tower may be varied by regulating the temperature of the gas at the inlet. This may readily be done by regulating the temperature of the gases passing through the electrical precipitator by means of a jacket through which hot waste flue gas is circulated.

If it is desired to remove as much of the light constituents as possible from the scrubbing medium, the gases passing through the electrical precipitator may be heated to the maximum by passing as much hot flue gas as is necessary through the jacket.

In the drawings,

Fig. 1 shows a plan view of a coke oven battery and an electrical precipitator and scrubber in a by-product recovery system; and Fig. 2 is an enlarged detail showing an elevation of part of Fig. 1;

Fig. 3 is a section of the precipitator shown in Fig. 2.

Referring to the drawings, 5 is a coke oven battery from which the gases pass by means of the uptake pipe 6 into the collector main 7 and from there to the center box 8 and thence through the main 9 to the electrical precipitator 17. From the precipitator the gases pass through the pipe 10 to the scrubber 11, which is supplied through the pipe 12 and drained through the pipe 13.

The electrical precipitator may be of any suitable form of construction. Preferably it may consist of a shell 17 enclosing a number of tubes 18 supported in heads 19 and 20 within the shell. An inlet 21 near the bottom of the shell communicates with the chamber 22 which is partially separated from the tube section by a baffle 23. An outlet 24 permits the escape of the gases after the latter have passed through the tubes.

A plurality of electrodes 24', preferably in the form of metal rods, extend through the tubes and are supported on bus-bars 26 near the upper end of the tubes. The bus-bar extends at both ends into the casings 27 which enclose insulators 28 upon which the bus-bar is supported. The high tension current line extends into one of the casings 27 and connects with the bus-bar 26, thus supplying the necessary current from any suitable source of uni-directional current under high tension. The casing of the separator is grounded or otherwise connected to the source of current to complete the circuit. In any case it is advisable to ground the shell of the precipitator to avoid all danger of injury to attendants. The casing and tubes form the positive electrode, the electrodes connected to the bus-bar being negative. The form and arrangement of conductors in the circuit can be varied. The arrangement should be such as to supply high tension uni-directional current to the electrodes, thereby permitting a continuous silent discharge between the electrodes and the tubes through which the gases pass.

The gases carrying tar in the form of globules or "tar fog", together with solid materials such as carbon, etc., in finely divided form, enter the electrical precipitator from the collector main 7 and pass through the tubes in the precipitator, being subjected therein to the electrical discharge which causes liquid and solid particles to separate from the fixed gases and condensable vapors. The separated liquids, together with the solid particles, run down the inner walls of the tubes into the chamber 22 and can be withdrawn through a pipe 29 from the bottom of the precipitator. The gases carrying the condensable vapors escape through the outlet 24 and are delivered through the pipe 10 to the scrubber.

The precipitator is enclosed in part in the jacket 30, which is supplied with hot flue gases through the pipe 31. The cooled flue gases pass out through the pipe 32. The gases may exhaust directly into the flue or stack, preferably at a point where there is considerable suction, or, if necessary, an exhauster may be supplied to remove the waste flue gases.

A portion of the waste flue gases pass through 33 and by proper regulation of the valves 34 and 35 a portion or all of the gases passing through 33 may be sent through the jacket of the precipitator. Where several precipitators are in use, that portion of the flue gas taken from the waste gas system passing through 33 may be passed entirely through the precipitator which is the first in the series and then through each of the other precipitators in the series, in which case the temperature of the gas entering each succeeding precipitator will be less than the temperature of the gas entering the next preceding precipitator. Other arrangements for supplying heating medium may be arranged, e. g., by-passing a portion of the gas around the first precipitator and combining it with the cooler gases emerging from the first precipitator and then by-passing a portion of these combined gases around the second precipitator, etc., or only gas from 33 may be passed through each, the quantity passed through each being regulated. By proper regulation of the valves in the various precipitators, the same or different heating may be accomplished in each of the precipitators.

Heat in the flue gases may be economized by placing the electrical precipitator as near as possible to the flues leading to the stack. Instead of bringing the cross-over main off a center-box, as shown in the drawings, it may be taken off the end of the collector main, in which case the precipitator may be located near the flues.

The amount of heat supplied to the precipitator may be controlled by regulating the quantity of hot flue gases admitted through the pipe 31. The quantity of heat may be lessened by cutting down the quantity of flue gas passed through the pipe 31 or the hot flue gases may be diluted with a gas of lower temperature. The best heating results are obtained when the quantity of heating medium passing through the jacket is at or near the maximum, because then the heat is more evenly distributed than when only a small quantity of gas is circulated through the jacket. It, therefore, may be better at times to dilute the hot flue gases with a cold gas, as air, rather than reduce the quantity of gas passed through the jacket, and this procedure will be the more desirable, the smaller the amount of hot flue gas to be supplied to the jacket.

A pipe 36 with valve 37 is provided for the introduction of cold air to control the temperature of the gases encircling the precipitator. The air may be supplied through the pump 38, although this will not be necessary if there is a good suction in the flue or stack to exhaust the waste gases, or if the exhauster is in operation. By proper adjustment of the valves 34, 35 and 37, the temperature of the gases in the jacket of the precipitator may be controlled within limits.

The invention is independent of any particular method of operation of the coke oven and is independent of any particular manner or spraying in the goose-neck and collector main. Although in its broadest aspects the invention involves the treatment of coal-distillation or coal-gasification gases passing through an electrical precipitator, in its narrower aspects it relates to the utilization of a jacketed precipitator in connection with a coke oven operation in which the jacket is heated with flue gases. The flue gas may be passed through one precipitator or through more than one precipitator in series. The entire amount of the hot flue gas withdrawn from the waste gas system may be passed through each precipitator jacket, or only a portion of the hot gas thus withdrawn may be passed through any precipitator jacket. The temperature of the gas passing through the jacket of any precipitator may be lowered, as by admixing cold gas such as cold air with the hot flue gases. The flue gas may be tapped off a zone at the required temperature, or hotter flue gas may be drawn upon, admitting an inert gas such as air, for instance, to cool the hot gas down to the desired temperature. The flue gas, after passing through the precipitator apparatus is returned to the flue where sufficient suction attains, and is thence conducted to the stack, or if the stack draft is not sufficient to overcome the pressure drop in the system, a mechanical blower or exhauster may be installed.

The invention is not restricted to the specific illustration here disclosed, but it is to be construed as defined in the accompanying claims.

I claim:—

1. In a coal distillation plant having an oven or retort, means for heating the same by combustion, a discharge flue communicating with said means, a by-pass around a portion of said flue, a precipitator for separating from gas non-gaseous matter entrained therein, means for passing gases from the oven or retort to the precipitator, and a jacket for said precipitator adapted for heat exchange therewith, said jacket being in said by-pass.

2. In a coal distillation plant having an oven or retort, means for heating the same by combustion, a discharge flue communicating with said means, a precipitator for separating from gas non-gaseous matter entrained therein, means for passing gases from the oven or retort to the precipitator, a jacket for the precipitator adapted for heat exchange therewith, means for conveying gases from the flue to said jacket, and means for introducing cold gases directly into the means for conveying the flue gases from the flue to the jacket.

In testimony whereof I affix my signature.

STUART PARMELEE MILLER.